(12) United States Patent
Kato et al.

(10) Patent No.: US 7,564,671 B2
(45) Date of Patent: Jul. 21, 2009

(54) ION GENERATOR AND METHOD FOR CONTROLLING AMOUNT OF OZONE GENERATED IN THE SAME

(75) Inventors: Shinji Kato, Osaka-fu (JP); Yukihiko Yoshida, Nagakakyo (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/765,059

(22) Filed: Jun. 19, 2007

(65) Prior Publication Data
US 2007/0236856 A1    Oct. 11, 2007

Related U.S. Application Data

(63) Continuation of application No. PCT/JP2007/052197, filed on Feb. 8, 2007, and a continuation of application No. PCT/JP2006/324003, filed on Nov. 30, 2006.

(30) Foreign Application Priority Data

Feb. 9, 2006    (JP)    ............................. 2006-033122

(51) Int. Cl.
*H01T 23/00*    (2006.01)
*H05F 3/06*    (2006.01)
(52) U.S. Cl. ..................... 361/231; 361/232; 361/236
(58) Field of Classification Search ................. 361/231, 361/232, 235
See application file for complete search history.

(56) References Cited

U.S. PATENT DOCUMENTS 3,665,241 A * 5/1972 Spindt et al. ............... 313/351
4,008,412 A * 2/1977 Yuito et al. .................. 313/309
5,008,594 A * 4/1991 Swanson et al. ......... 315/111.81
5,885,860 A * 3/1999 Weitzel et al. ............... 438/179
6,174,500 B1 * 1/2001 Uno et al. ............... 422/186.14
6,907,888 B2 * 6/2005 Saida et al. .................. 132/271
7,120,007 B2 * 10/2006 Nakasone et al. ........... 361/231
7,350,371 B2 * 4/2008 Lee et al. ....................... 62/317

FOREIGN PATENT DOCUMENTS

| JP | 04-306596 | * | 10/1992 |
| JP | 06-318490 | | 11/1994 |
| JP | 07-006857 | | 10/1995 |
| JP | 2003-187945 | * | 7/2003 |
| JP | 2004-192993 | | 7/2004 |
| JP | 2005-063827 | | 3/2005 |

* cited by examiner

*Primary Examiner*—Stephen W Jackson
*Assistant Examiner*—Zeev Kitov
(74) *Attorney, Agent, or Firm*—Dickstein, Shapiro, LLP.

(57) ABSTRACT

An ion generator that can generate a controlled trace amount of ozone together with negative or positive ions. The ion generator includes an insulation substrate, a ground electrode and a high-voltage electrode on the insulation substrate, an insulating film formed on the ground electrode, and a wire electrode. The root of the wire electrode is soldered to the high-voltage electrode. The tip of the wire electrode is arranged so as to protrude in a recessed part. The ground electrode has a pair of legs disposed on the insulation substrate at the sides of the recessed part. The legs are parallel to the wire electrode on opposite sides of the wire electrode. The insulating film is provided on the surface of the ground electrode to cover the ground electrode except the high-voltage electrode contacting a first terminal, a contact portion contacting a second terminal and parts of the legs of tips of the ground electrode that face the tip of the wire electrode.

13 Claims, 3 Drawing Sheets

US 7,564,671 B2

ION GENERATOR AND METHOD FOR CONTROLLING AMOUNT OF OZONE GENERATED IN THE SAME

CROSS REFERENCE TO RELATED APPLICATIONS

The present application is a continuation of International Application No. PCT/JP2007/052197, filed Feb. 8, 2007, and International Application No. PCT/JP2006/324003, filed Nov. 30, 2006, which both claim priority to Japanese Patent Application No. JP2006-033122, filed Feb. 9, 2006, the entire contents of each of these applications being incorporated herein by reference in their entirety.

TECHNICAL FIELD

The present invention relates to an ion generator, and more particularly, to an ion generator used in an ion generating circuit for an air cleaner, an air conditioner and the like, and to a method for controlling the amount of ozone generated in the ion generator.

BACKGROUND ART

Recently, there has been a demand for deodorization and sterilization by generating a trace amount of ozone as well as negative ions with an ion generator. However, high levels of ozone have germicidal activities which are too high and can be harmful to the human body. The amount of ozone thus must be controlled to an adequate level.

There is a conventionally known ion generator of this type, which has been described in Patent Document 1. In the ion generator, to minimize generation of ozone, the whole surface of a ground electrode provided on an insulation substrate is covered with an insulating resin. The ion generator thus cannot generate a trace amount of ozone as required.

Patent Document 2 has described an apparatus for generating a steady amount of ozone by maintaining a steady power source voltage applied to a high-voltage generator using an amplitude restricting means to arbitrarily restrict the voltage amplitude of a commercial electric power supply. However, the apparatus generates ozone only, and hardly generates a trace amount of ozone.

Patent Document 1: Japanese Unexamined Patent Application Publication No. 2005-63827
Patent Document 2: Japanese Unexamined Patent Application Publication No. 07-6857

SUMMARY OF THE INVENTION

The object of the present invention is to provide an ion generator that can generate a controlled trace amount of ozone together with negative or positive ions, and a method for controlling the amount of ozone generated in the same.

To achieve the object, the ion generator according to the present invention includes an insulation substrate having a ground electrode provided on the surface thereof and a metal electrode attached to the insulation substrate such that the metal electrode faces the ground electrode.

The surface of the ground electrode is completely covered with an insulating film except for a part of a tip of the ground electrode facing a tip of the metal electrode.

In the construction, since the tip of the ground electrode is not covered with the insulating film, a leakage current can flow between the ground electrode and the metal electrode, and thereby a trace amount of ozone is generated together with generation of ions. The amount of ozone generated is controlled to a trace amount by changing the area and/or position of the part of the tip of the ground electrode not covered with the insulating film such as into a rectangular form over the whole width of the ground electrode to control an amount of leakage current.

In the ion generator according to the present invention, preferably, the metal electrode is a wire electrode having a constant diameter. Preferably, the ground electrode and the metal electrode are disposed parallel to each other in the length direction. This construction makes control of the amounts of ions and ozone generated much easier. A ground electrode formed with a resistor allows easy control of the amount of ozone generated by changing the resistance of the resistor.

The insulation substrate may have a recessed part at one side thereof. The wire electrode may have its tip side protruding in the recessed part. The insulation substrate may have a ground electrode having two legs, which are disposed on the insulation substrate on different sides of the recessed part so as to lie on both sides of the wire electrode in parallel therewith. This allows planar construction of the wire electrode, the ground electrode and the like, and hence a thin ion generator can be obtained.

The ion generator according to the present invention may further include a high-voltage electrode that is provided on the insulation substrate and is to be connected with the wire electrode, a first terminal that is contact-connected to the high-voltage electrode and has a retaining portion for a lead wire, a second terminal that is contact-connected to the ground electrode and has a retaining portion for a lead wire, and a case for housing the insulation substrate, the ground electrode, the wire electrode, the high-voltage electrode, the first terminal, and the second terminal. The ion generator according to the present invention may further include a high-voltage power supply that generates a negative or positive voltage and is connected to the high-voltage electrode. This construction can provide a small ion generator with a low production cost.

The method for controlling the amount of ozone generated according to the present invention is a method for controlling the amount of ozone generated in an ion generator including:

an insulation substrate having a ground electrode provided on the surface thereof;

a metal electrode attached to the insulation substrate such that the metal electrode faces the ground electrode; and an insulating film provided on the surface of the ground electrode that covers all but a part of a tip of the ground electrode facing a tip of the metal electrode, in which, the ground electrode is formed with a resistor, and the ion generator generates a desired amount of ozone by changing the resistance of the resistor.

In the present invention, the meanings of terms such as "parallel" and "rectangular" are not to be interpreted strictly, and may include the meanings of "substantially parallel" and "substantially rectangular" within the scope that does not impair the effect of the present invention.

According to the present invention, the exposed tip of the ground electrode allows a leakage current flowing between the ground electrode and the metal electrode to generate a trace amount of ozone together with ions. A change in the area and/or the position of the exposed part of the tip controls the amount of leakage current, and thereby the amounts of ozone generated and ions generated are controlled to adequate levels. The ground electrode formed with a resistor allows easy control of the amount of ozone generated by changing the resistance of the resistor to control the leakage current flowing between the ground electrode and the metal electrode.

DETAILED DESCRIPTION OF THE INVENTION

An ion generator and a method for controlling the amount of ozone generated in the same according to an embodiment of the present invention will be described below with reference to the attached drawings.

Figure 1:
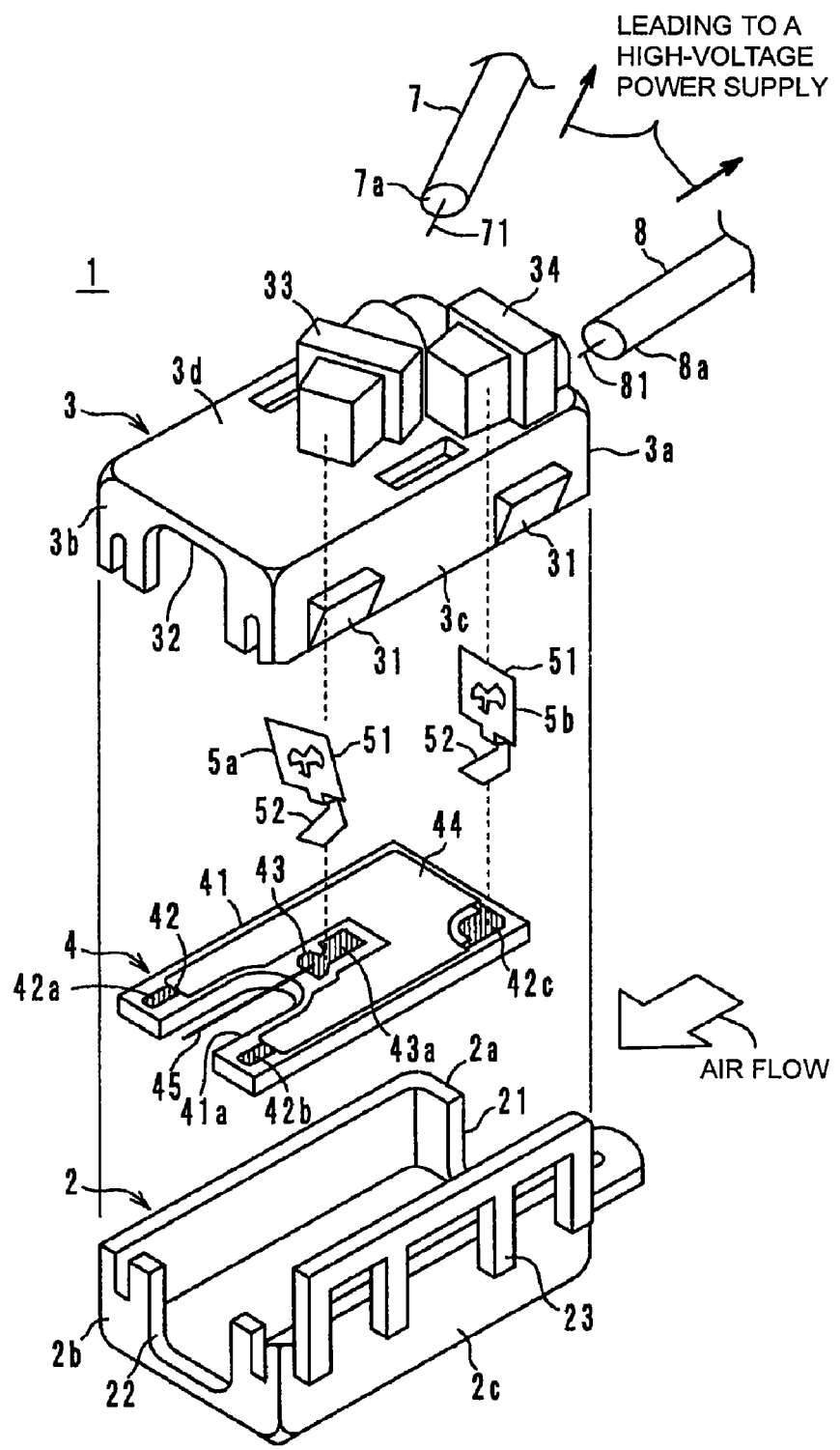
FIG. 1 is an exploded perspective view of the ion generator according to an embodiment of the present invention.
Figure 2:
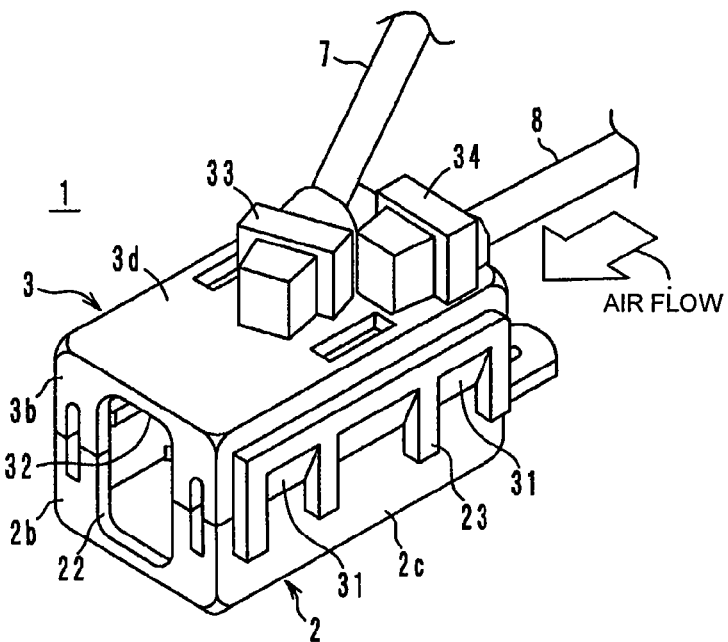
FIG. 2 is an external perspective view of the ion generator shown in FIG. 1.

FIG. 1 is an exploded perspective view of an ion generator 1. FIG. 2 is an external perspective view of the ion generator 1. As shown in FIG. 1, the ion generator 1 includes a lower resin case 2, an upper resin case 3, an ion-generating component 4, a first terminal 5a, a second terminal 5b, lead wires 7 and 8, and a high-voltage power supply.

The lower resin case 2 has an air inlet 21 formed in a sidewall 2a at one end and an air outlet 22 formed in a sidewall 2b at the other end. The lower resin case 2 also has a retaining arm 23 formed on a front sidewall 2c.

The upper resin case 3 has an air inlet (not shown) formed in a sidewall 3a at one end and an air outlet 32 formed in a sidewall 3b at the other end. The upper resin case 3 also has two claws 31 formed on a front sidewall 3c. By fitting the claws 31 in the retaining arm 23 of the lower resin case 2, the upper resin case 3 and the lower resin case 2 are firmly joined to each other to form an air-permeable resin case. The ion-generating component 4 and the first and second terminals 5a and 5b are arranged in a housing space defined by the upper resin case 3 and the lower resin case 2 inside thereof.

Figure 3:
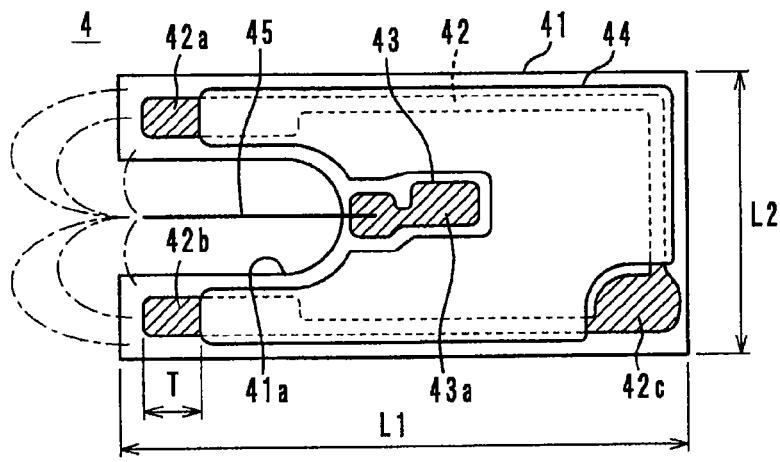
FIG. 3 is a plan view of an ion-generating component shown in FIG. 1.

As shown in FIG. 3, the ion-generating component 4 has a ground electrode 42 and a high-voltage electrode 43 on an insulating substrate 41, an insulating film 44 formed on the surface of the ground electrode 42, and a wire electrode (metal electrode) 45. The rectangular insulating substrate 41 is cut out at one side thereof to form a recessed part 41a. The root of the wire electrode 45 is soldered to the high-voltage electrode 43. The tip of the wire electrode 45 is arranged so as to protrude in the recessed part 41a. The wire electrode 45 is an ultrafine wire having a diameter not more than 100 μm. Examples of the ultrafine wire include a piano wire, a tungsten wire, a stainless steel wire and a titanium wire.

The ground electrode 42 has a pair of legs 42a and 42b disposed on the insulation substrate 41 at the sides of the recessed part 41a. The legs 42a and 42b are parallel to the wire electrode 45 and are disposed on opposite sides of the wire electrode 45. This construction makes control of ion and ozone generation easier. The insulating film 44 is provided on the surface of the ground electrode 42 to cover the ground electrode 42 except the high-voltage electrode 43 contacting the first terminal 5a, a contact portion 42c contacting the second terminal 5b, and parts of tips of the ground electrode 42 (parts of the legs 42a and 42b) that parts face the tip of the wire electrode 45. In this embodiment, exposed parts not covered with the insulating film 44 in the legs 42a and 42b are rectangular over the whole width of the ground electrode 42.

Examples of a material for the insulating film 44 include silicone and glass glaze. The ground electrode 42 has a resistance of approximately 50 MΩ. Examples of a material for the ground electrode 42 include resistors such as ruthenium oxide paste and carbon paste. Ruthenium oxide is particularly preferred material, because it does not migrate even when an intense electric field is applied thereto.

Each of the first and second metal terminals 5a and 5b is composed of a retaining portion 51 and a foot 52. The retaining portions 51 are fitted in holding portions 33 and 34 formed on the upper surface 3d of the upper resin case 3. The foot 52 of the first terminal 5a is contact-connected with a contact portion 43a of the high-voltage electrode 43. The foot 52 of the second terminal 5b is contact-connected with a contact portion 42c of the ground electrode 42.

An end portion 7a of the high-voltage lead wire 7 is fitted in an opening (not shown) formed in the front surface of the holding portion 33 of the upper resin case 3. A core wire 71 is engaged with and electrically connected to the retaining portion 51 of the terminal 5a. Similarly, an end portion 8a of the ground lead wire 8 is fitted in an opening (not shown) provided in the front surface of the holding portion 34, and a core wire 81 is engaged with and electrically connected to the retaining portion 51 of the terminal 5b.

The high-voltage lead wire 7 is connected to a high-voltage output terminal of the high-voltage power supply. The ground lead wire 8 is connected to a ground terminal of the high-voltage power supply. The high-voltage power supply generally supplies a negative direct-current voltage, but it may supply an alternating-current voltage obtained by superimposing negative direct-current biases. The ion generator 1 is incorporated in, for example, an air cleaner or an air conditioner. That is, the high-voltage power supply and the ion-generating unit are mounted in a power-supply controller and an air blow path of the air cleaner or the like, respectively, and thereby the air cleaner or the like blows out air containing negative ions.

The ion generator 1 having the above-described construction can generate negative ions at a voltage of −1.3 kV to −3.0 kV (central value). That is, when a negative voltage is applied to the wire electrode 45, an intense electric field is produced between the wire electrode 45 and the ground electrode 42. The tip of the wire electrode 45 is subjected to dielectric breakdown and is brought into a corona discharge state. At this time, molecules in the air around the tip of the wire electrode 45 are brought into a plasma state, and separated into positive ions and negative ions. The wire electrode 45 absorbs the positive ions in air to leave the negative ions.

The wire electrode 45 having a thin leading end (having a small radius of curvature) more easily concentrates electrons and more easily produces an intense electric field than an electrode having a thick leading end. Therefore, the use of the wire electrode 45 allows generation of negative ions even by application of a low voltage. Since a lower voltage than ever before can be applied, safety can be improved. In addition, since the wire electrode 45 and the ground electrode 42 are disposed in a planar arrangement on the insulation substrate 41, they occupy a small space, and hence the ion generator 1 can be downsized.

Further, each of the legs 42a and 42b of the ground electrode 42 has an exposed part not covered with the insulating film 44, and thereby a leakage current flows between the ground electrode 42 and the wire electrode 45. The leakage current decomposes an oxygen molecule $O_2$ in the air to oxygen atoms O. Each of the oxygen atoms O then reacts with an oxygen molecule $O_2$ in the air to form an ozone molecule $O_3$ ($O_2+O \rightarrow O_3$). The amount of leakage current can be controlled by changing the areas and positions of the exposed parts not covered with the insulating film 44 in the legs 42a and 42b of the ground electrode 42. The control of the leakage current in turn causes the amount of oxygen molecules decomposed to be regulated, and thereby a trace amount of ozone generated can be adjusted. Consequently, the ion generator 1 capable of controlling the generation of ions and trace ozone to adequate amounts can be obtained.

That is, the ion generator 1 allows a leakage current flowing between the wire electrode 45 and the ground electrode 42, and thereby generates ozone. Since electric fields are concentrated at the tip of the wire electrode 45, the ground electrode 42 (legs 42a and 42b) having exposed parts near the tip can easily generate a leakage current. The ion generator 1 thus can generate ozone with a low voltage.

Figure 4:
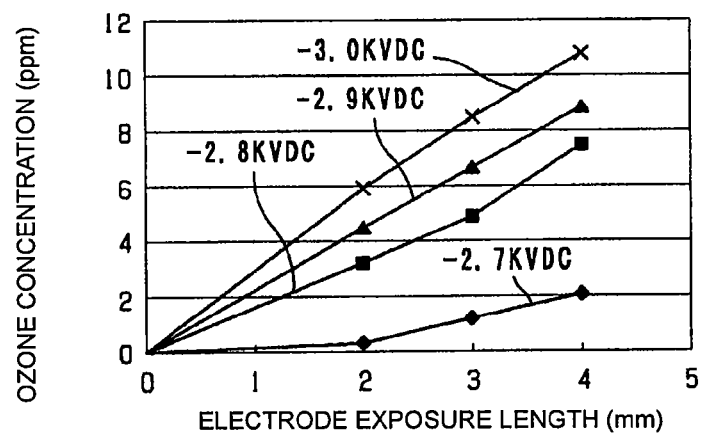
FIG. 4 is a graph showing the relationship between the electrode exposure length and the amount of ozone generated.

FIG. 4 shows measured amounts of ozone generated in various lengths T of exposed parts (electrode exposure length T: see, FIG. 3) not covered with the insulating film 44 in the legs 42a and 42b. In the measurement, sizes L1 and L2 of the insulation substrate 41 were 20 mm and 10 mm, respectively. A measurement point was set leeward of the ion generator 1 at a distance of 10 mm therefrom. The wind velocity was 0 m/s. FIG. 4 shows measurements with four different voltages applied to the wire electrode 45 from −2.7 to −3.0 KVDC.

As described above, the amount of ions generated depends on electric field strength, and the amount of ozone generated depends on the amount of leakage current. The amount of leakage current is changed by changing the resistance of a resistor used as the ground electrode 42, and thereby the amount of ozone generated can be controlled. When the resistance is increased, the amount of leakage current is decreased and the amount of ozone generated is decreased. When the resistance is decreased, the amount of leakage current is increased and the amount of ozone generated is increased. For changing the resistance, the type of the resistor used may be changed. Alternatively, to enable the individual ion generator 1 to control the amount of ozone generated according to need, the ground electrode 42 is preferably a variable resistor having a variable resistance. A resistor attached with a known potentiometer can easily control the amount of ozone generated.

According to the change in the resistance of the ground electrode 42 (resistor), the amount of ions generated is also changed to some extent. That is, when the resistance is increased, the amount of leakage current is decreased, a voltage drop loss caused by the current is decreased, and the amount of ions generated is increased. When the resistance is decreased, the amount of leakage current is increased, the voltage drop loss caused by the current is increased, and the amount of ions generated is decreased. However, the increase or decrease in the amount of ions generated is comparatively much smaller than the increase or decrease in the amount of ozone generated. Consequently, only the amount of ozone generated can be controlled. As described above, by controlling only the amount of ozone generated, for example, deodorization and sterilization can be temporarily performed in a focused way.

The ion generator and the method for controlling the amount of ozone generated in the same according to the present invention are not limited to the above-described embodiment, and various modifications are possible within the scope of the invention.

Figure 5:
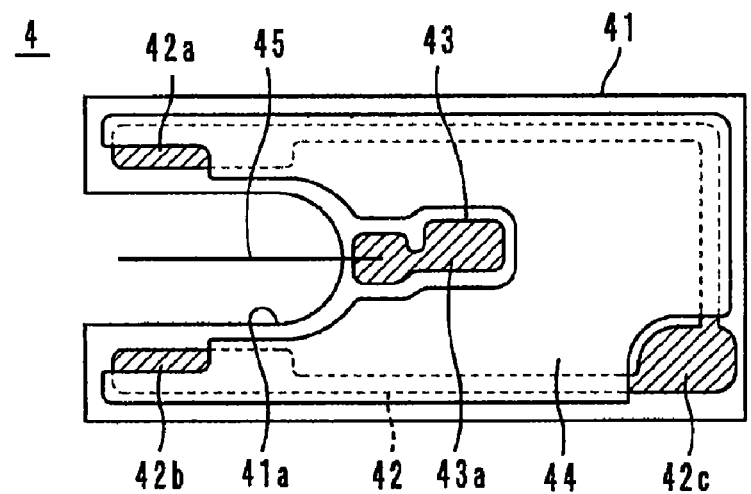
FIG. 5 is a plan view depicting a variation in the ion-generating component.
Figure 6:
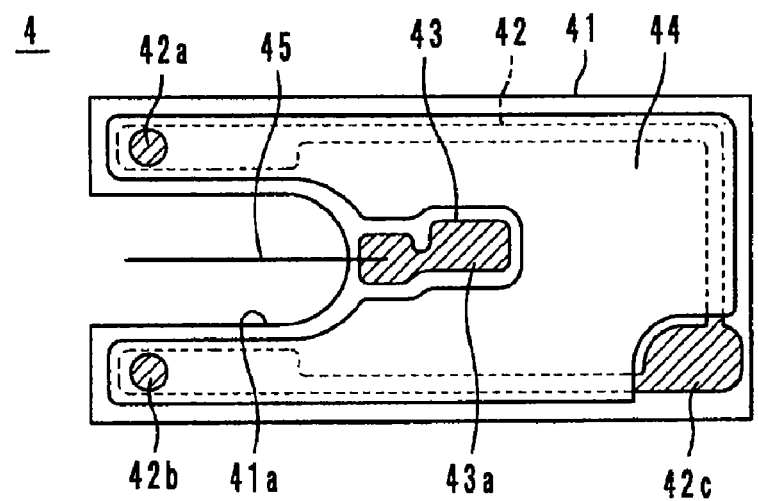
FIG. 6 is a plan view depicting another variation in the ion-generating component.

For example, the exposed parts of the legs 42a and 42b of the ground electrode 42 not covered with the insulating film 44 can be of any shape. They may be rectangular as shown in FIG. 5 or circular as shown in FIG. 6. These exposed parts may be distributed at a plurality of positions.

The number of wire electrodes in the ion generator is not limited to one. The ion generator may comprise two or more wire electrodes. However, when two or more wire electrodes are provided, it is necessary to pay attention to the distance therebetween. Because the electric field distribution is disturbed and the discharging efficiency is reduced when the distance is too short.

The present invention is applicable to the generation of positive ions as well as the generation of negative ions. In this case, a high-voltage power supply generating a positive voltage is used, and a high-voltage electrode is applied with a positive voltage.

As described above, the present invention is useful for an ion generator used in an ion generating circuit for an air cleaner, an air conditioner or the like, and a method for controlling the amount of ozone generated in the same. The present invention is excellent particularly in the point of being capable of generating a trace amount of ozone in a controlled adequate level.

The invention claimed is:

1. An ion generator, comprising:
   an insulation substrate;
   a ground electrode provided on a surface of the insulation substrate;
   a metal electrode attached to the insulation substrate such that the metal electrode faces the ground electrode; and
   an insulating film covering the ground electrode except for a part of a tip of the ground electrode facing a tip of the metal electrode.

2. The ion generator according to claim 1, wherein the metal electrode is a wire electrode.

3. The ion generator according to claim 2, wherein the wire electrode has a constant diameter.

4. The ion generator according to claim 1, wherein the ground electrode and the metal electrode are disposed parallel to each other in a length direction.

5. The ion generator according to claim 1, wherein the part of the tip of the ground electrode not covered with the insulating film has a rectangular form over a width of the ground electrode.

6. The ion generator according to claim 1, wherein the ground electrode is formed with a resistor.

7. The ion generator according to claim 6, wherein a resistance of the resistor is variable.

8. The ion generator according to claim 1, wherein the insulation substrate has a recessed part at one side thereof, the tip of the metal electrode being arranged so as to protrude into the recessed part.

9. The ion generator according to claim 8, wherein the ground electrode has two legs, the two legs being respectively disposed on the insulation substrate on different sides of the recessed part.

10. The ion generator according to claim 9, wherein the two legs of the ground electrode are arranged on both sides of the metal electrode and parallel thereto.

11. The ion generator according to claim 1, further comprising:
   a high-voltage electrode provided on the insulation substrate and connected to the metal electrode;
   a first terminal connected to the high-voltage electrode;
   a second terminal connected to the ground electrode; and
   a case housing the insulation substrate, the ground electrode, the metal electrode, the high-voltage electrode, the first terminal, and the second terminal.

12. The ion generator according to claim 11, further comprising a high-voltage power supply that generates a voltage, wherein the high-voltage power supply is connected to the high-voltage electrode.

13. A method for controlling an amount of ozone generated in an ion generator comprising an insulation substrate; a ground electrode provided on a surface of the insulation substrate; a metal electrode attached to the insulation substrate such that the metal electrode faces the ground electrode; and an insulating film covering the ground electrode except for a part of a tip of the ground electrode facing a tip of the metal electrode, the method comprising:

forming the ground electrode with a resistor; and
generating a desired amount of ozone by changing a resistance of the resistor.

* * * * *